UNITED STATES PATENT OFFICE.

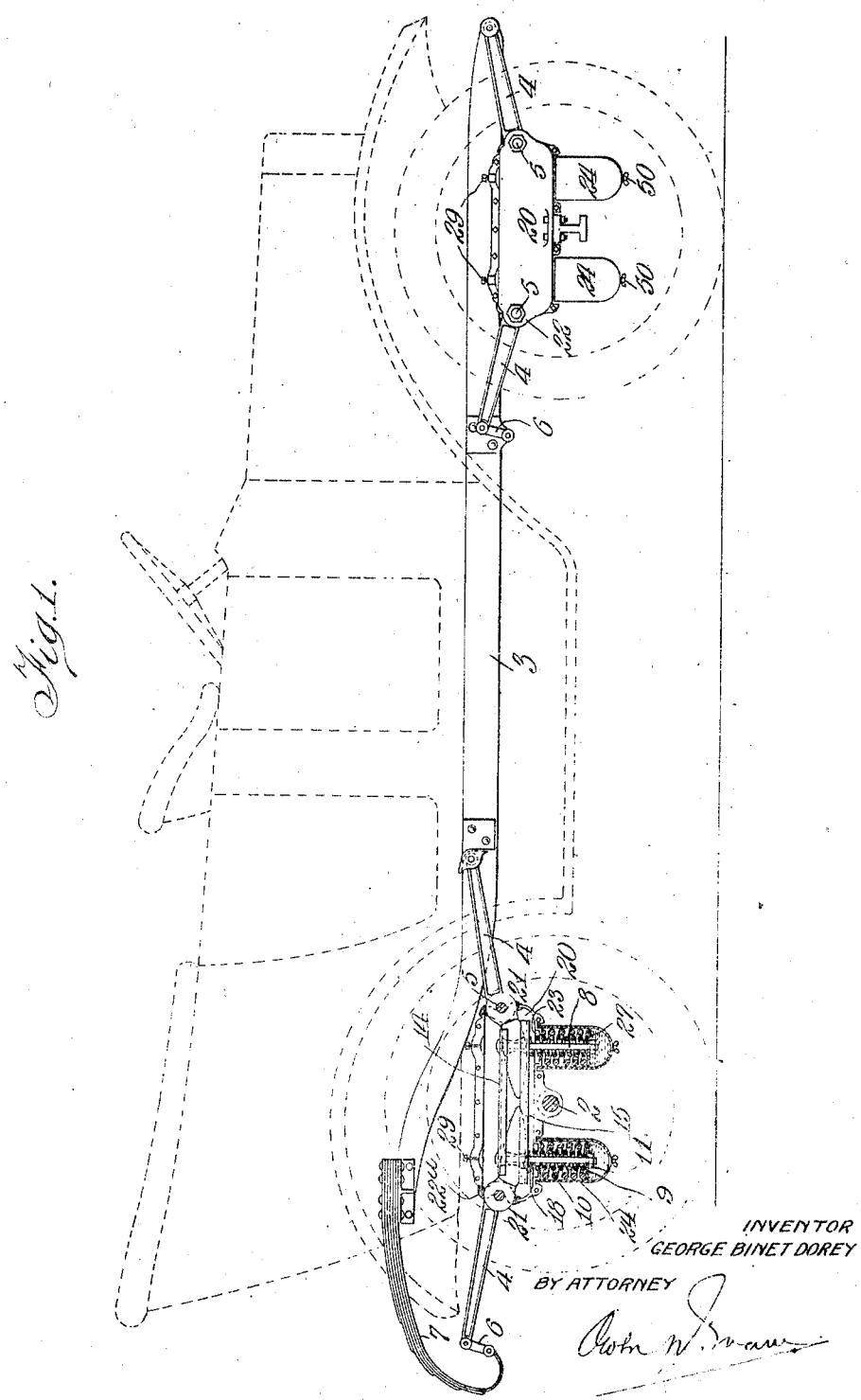

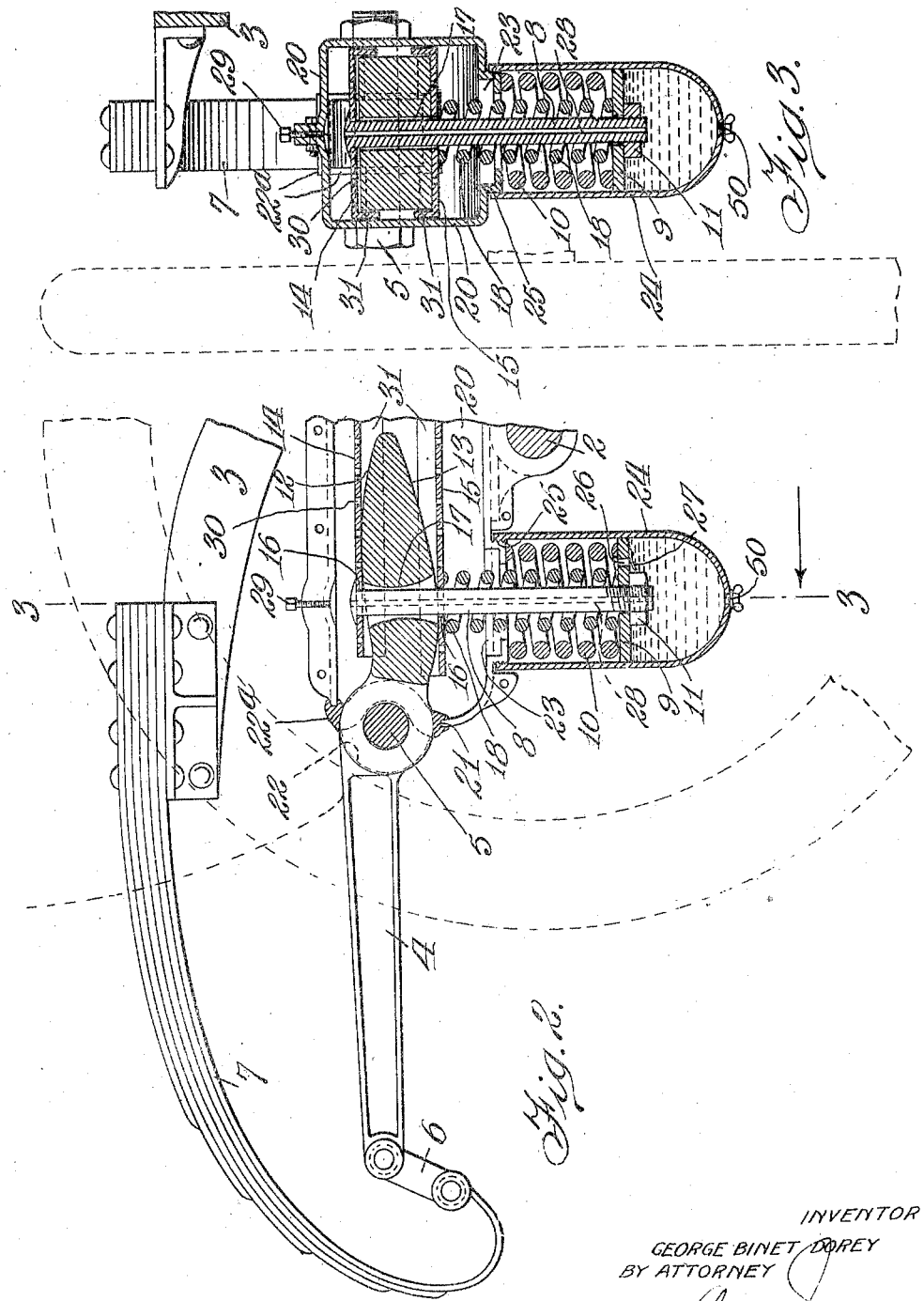

GEORGE BINET DOREY, OF MONTREAL, QUEBEC, CANADA.

SHOCK-ABSORBER.

1,308,171.　　　　　Specification of Letters Patent.　　Patented July 1, 1919.

Application filed March 12, 1917.　Serial No. 154,324.

*To all whom it may concern:*

Be it known that I, GEORGE BINET DOREY, a subject of the King of Great Britain, and resident of the city of Montreal, Province of Quebec, Canada, have invented certain new and useful Improvements in Shock-Absorbers; and do hereby declare the following to be a full, clear, and exact description of same.

This invention relates to shock absorbers and appertains particularly to shock absorbers employing differential lever devices and has for an object to provide a novel and improved differential lever equipment.

Another object is to incorporate in the construction of the device a protective casing for the exclusion of foreign matter and protection from untoward damage.

Another object is to so construct the shock absorber as to facilitate the whole or partial dismemberment thereof for inspection or renewal of parts.

Another object is to provide for an improved automatic lubrication of the device.

The above with further objects and advantages will be hereinafter more fully described and particularly pointed out in the appended claims.

For full comprehension, however, of my invention reference should be had to the accompanying drawings forming a part of this specification, in which similar reference characters indicate the same parts and wherein:

Figure 1 illustrates in side elevation partly in section the application of my improved shock absorber to an automobile;

Fig. 2 illustrates in enlarged side elevation partly in section, the device under load; and Fig. 3 is a transverse section on line 3—3 Fig. 2.

Referring now to the drawings wherein I have illustrated the adoption of my device to the spring suspension of an automobile, 2 indicates the axles and 3 the body, one having movement with relation to another.

Although I have illustrated the device applied to both front and rear axles the description will be principally confined to one, the reference characters being in substantially all instances applicable to both front and rear suspensions.

A lever 4 is pivoted between its ends at 5 in such manner that the position of the pivotal connection is stationary with respect to one of the parts between which there is relative movement, for instance the axle 2. One end of the lever, the outer end is suitably connected to the other part, the body 3, by a pivot link 6 as shown at the front of Fig. 1 or by laminated spring 7 as shown at the rear or in other suitable manner accommodating movement of the body and axle.

The opposite or inner end of the lever carries a bolt 8 which, depending therefrom has a collar 9 mounted upon its lower end and between which collar and an abutment having a position stationary with relation to the axle, a coil spring 10 bears and resists upward movement of the inner end of the lever. The spring encircles the bolt and the collar is held upon the bolt by a nut 11 screwed upon the lower end of the bolt and serving in addition as a means of adjustment for the tension of the coil spring or for the replacing of the latter.

The inner end of the lever 4 is flattened in the plane of the pivot and in the form shown the lever is fulcrumed to swing vertically, the top and bottom of such inner end having convex parabolical surfaces 12 and 13 disposed between top and bottom friction plates 14 and 15, through which and the inner end of lever 4 the bolt 8 passes. The plates are suitably apertured with vertically arranged bolt openings 16 and the lever formed with a bolt opening 17 registering with openings 16 and preferably flared toward its ends to accommodate the swinging movement of the lever. The head of the bolt rests upon top plate 14 and the leverage is transmitted to the spring through the plate and bolt, the bottom plate forming an abutment for a coil spring 18 which encircles the bolt within the coil 10 and bearing between said bottom plate and collar 9 serves to resist spreading of the friction plates and also supplements the action of spring 10 as will be more fully described.

When in operation, the outer end of lever 4 moves down under load and raises the inner end against the resistance of spring 10 which is compressed as the washer 9 is moved up by the bolt, the influence of which is, as the movement of the lever increases, gradually increased by a decrease of the leverage effected through the medium of the curved surface 12, the latter rolling upon the underside of plate 14 and increasing the distance between fulcrum 5 and the point of contact between the lever and top plate as illustrated by the respective positions of the lever in Figs. 1 and 2.

When, during the decrease in leverage, the points of contact between lever surfaces 12 and 13 and plates 14 and 15 pass dead center position, the area of surface 12 in frictional contact with plate 14 gradually increases, thus increasing the frictional resistance in conjunction with the decreasing leverage, such frictional resistance being increasingly augmented from said dead centering position by the action of spring 18 which as it is compressed between bottom plate and collar 9 increases the resistance to the spreading apart of the plates by the cam-like action of the curved lever arm.

The rebound is dampened by the reverse action of the inner end of the lever in gradually increasing the leverage exerted by surface 12 upon spring 10 and gradually decreasing the leverage exerted by surface 13 directly through the bottom plate upon spring 18, such surface 13 gradually rolling to the position shown in Fig. 1 and in like manner to that described in connection with surface 12 increasing its frictional contact with the bottom plate.

In the embodiment shown the equipment is duplicated at either side of the axle, the above description being applicable to both and which act in conjunction, the plates 14 and 15 being preferably extended from one to the other to serve both and being flanged at the sides at 31 to straddle the levers.

The inner ends of the levers and the friction plates are inclosed within a casing 20 consisting preferably of two half sections bolted together and fixed upon the axle so that their position is stationary thereto, such casing having end apertures 21 through which the outer ends of the levers protrude, the sides of the casing providing bearings 22 for pins 5 each of which carry one of the levers and constitute the before mentioned fulcrum the position of which is stationary with relation to the axle. The sides of the casing are close to the levers and serve to prevent lateral twisting of the same. The edges of the apertures 21 are bordered by strips 22ª of brass or other suitable metal to provide a tight joint excluding dust and other foreign matter, each lever adjacent its fulcrum being rounded at the top and bottom concentrically with its pin 5 and the top and bottom strips being correspondingly curved.

The bottom of the casing is apertured at 23 for the accommodation of bolts 8 and springs 18, the springs 10 bearing against the underside of the casing which constitutes the before mentioned abutment having a position stationary with relation to the axle.

Each set of springs 10 and 18 is inclosed by a cap 24 which is screwed upon a boss 25 surrounding the aperture 23 and while serving as an extension of the protective casing 22 can be quickly removed to expose the springs for inspection or renewal or to permit of adjustment of the springs.

The caps 24 serve to close the apertures 23 and thus exclude foreign matter from the interior of the casing and in addition constitute oil or other lubricant cups, such caps closely surrounding the washers 9 and providing spaces for the lubricant between the washers and the ends of the caps.

Each washer is provided with a port 26 controlled by a normally open spring valve 27 upon the underside of the washer while each bolt 8 is axially bored at 28 from top to bottom to bring the oil reservoirs at the bottoms of the cups into communication with the interior of the casing 20. The lubricant may be introduced through ports in the top of the casing, registering with the bores 28 and normally closed by plugs 29 while a draining opening is provided at 50.

With the arrangement just described the equipment is automatically lubricated because when the washers move down with the downward swing of the inner ends of the levers the valves are forced closed against the underside of the washers and the lubricant is forced up through the bores 28 and flows over the equipment through perforations 30 in the friction plates. The lubricant returns through the ports 26 when the valves 27 are again permitted to open upon the upward movement of the washers or when the equipment comes to rest.

What I claim is as follows:

1. The combination with two parts between which there is relative movement in a vertical direction, of a shock absorber controlling such movement and having therein a differential lever pivotally connected at one end to one of said parts and pivotally connected at its fulcrum point to the other of said parts, such fulcrum point being situated between the power and weight arms of the lever and the axes of the arms being in horizontal planes, and the weight arm of the lever presenting upper and lower convex parabolical operating surfaces.

2. The combination with two parts between which there is relative movement, of a shock absorber controlling such movement and having therein spring mechanism, a differential lever presenting a convex parabolical operating surface and being pivotally connected to each of said parts and fulcrumed between its power and weight arms, and movable plates in operative connection with the spring mechanism and adapted to be acted upon by the operating surface of the lever.

3. The combination with two parts between which there is relative movement, of a shock absorber controlling such movement and having therein spring mechanism, a lever having a portion thereof in differential engagement with the spring mechanism and a casing inclosing the top, bottom and sides of said portion of the lever.

4. The combination with two parts between which there is relative movement, of a shock absorber controlling said movement and having spring mechanism, a differential lever acting upon the spring mechanism and means for automatically lubricating the shock absorber.

5. The combination with two parts between which there is relative movement, of a shock absorber controlling said movement and having a main load resisting spring, a secondary spring and a differential lever acting upon said springs, the portion of the lever acting upon the springs being on the same side of both springs.

6. The combination with two parts between which there is relative movement, of a shock absorber controlling said movement and having a main load resisting spring, a secondary spring and a lever acting upon said springs and adapted when moved in one direction to compress both springs simultaneously, such lever reducing the leverage exerted upon one of said springs in proportion to increased movement of the lever in said direction and reducing the leverage exerted upon the other spring in proportion to increased movement of the lever in the opposite direction.

7. The combination with two parts between which there is relative movement, of a shock absorber controlling said movement and having a main load resisting spring, a secondary spring and a lever acting upon said springs at the same side of each of the latter and adapted to reduce the leverage exerted upon one of said springs in proportion to increased movement of the lever in one direction and reduce the leverage exerted upon the other spring in proportion to increased movement of the lever in the opposite direction.

8. The combination with two parts between which there is relative movement, of a lever fulcrumed to one of said parts, the lever at one side of the fulcrum being connected to the other of said parts and having at the opposite side of the fulcrum a parabolical surface substantially in the plane of the fulcrum, a movable abutment in engagement with the convex parabolical surface, spring mechanism and means connecting the abutment to the spring mechanism to resist the movement thereof.

9. The combination with two parts between which there is relative movement, a differential lever fulcrumed to one of said parts and connected to the other part, a spring, a movable plate at one side of the lever, connected to the spring and adapted to be moved by the lever against the influence of the spring, a second movable plate at the opposite side of the lever, said plates being adapted to be spread apart by the lever and a second spring resisting the spreading apart of the plates.

10. The combination with two parts between which there is relative movement, a differential lever fulcrumed to one of said parts and connected to the other part, a spring, a movable plate at one side of the lever, connected to the spring and adapted to be moved by the lever against the influence of the spring, a second movable plate at the opposite side of the lever, said plates being adapted to be spread apart by the lever and a second spring differentially resisting the spreading apart of the plates.

11. The combination with two parts between which there is relative movement, of a shock absorber controlling such movement and consisting of a lever fulcrumed between its ends to one of the parts and connected at one end to the other part, the opposite end of the lever presenting opposite convex parabolical surfaces, a friction plate engaging one of said surfaces, a second friction plate engaging the other surface, such plates being relatively movable, a bolt passing through plates and lever and carried thereby, a washer near the end of the bolt, an abutment the position of which is stationary with relation to the part to which the lever is fulcrumed, a spring bearing between the washer and abutment and a spring bearing between the washer and second mentioned friction plate.

12. The combination with two parts between which there is relative movement, of a shock absorber controlling such movement and consisting of a lever fulcrumed between its ends to one of the parts and connected at one end to the other part, the opposite end of the lever presenting opposite convex parabolical surfaces, a friction plate engaging one of said surfaces, a second friction plate engaging the other surface, a bolt passing through the plates and lever and carried thereby, a washer near the end of the bolt, and having a port therein, a normally open spring valve controlling the port, an abutment the position of which is stationary with relation to the part to which the lever is fulcrumed, a spring bearing between the washer and abutment, a spring bearing between the washer and second mentioned friction plate, a casing inclosing the curved end of the lever and having an aperture through which the spring mechanism extends, a cap inclosing the spring mechanism covering the aperture and fitting closely about the washer which latter is spaced from the end of the cap, and a supply of lubricant in the space at the end of the cap, said bolt being axially bored to bring the lubricant space into communication with the interior of the casing.

13. In a vehicle, the combination with the body thereof and the axle, of a casing carried by the axle and having a position stationary with relation thereto, such casing having an end aperture and a bottom aperture, a vertically swinging lever fulcrumed upon the casing and having one end extending outwardly through the end aperture and pivoted to the body, the opposite end extending inwardly and having the top and bottom surfaces of its inner end convexly curved in parabolical form, a friction plate in contact with the top curved surface, a second friction plate in contact with the bottom curved surface, such plates being relatively movable and flanged to straddle the lever and the plates and lever having registering openings in line with the bottom aperture, a bolt passing through the said openings and depending through the bottom aperture, a washer upon the lower end of the bolt, a nut holding the washer in place, a coil spring encircling the bolt and bearing between washer and the casing, a spring bearing between the washer and said second mentioned friction plate and a cap inclosing said springs and removably secured to the casing.

In testimony whereof, I have signed my name to this specification.

GEORGE BINET DOREY.